United States Patent [19]

Wissinger

[11] Patent Number: 5,592,320
[45] Date of Patent: Jan. 7, 1997

[54] SATELLITE COMMUNICATIONS SYSTEM

[75] Inventor: Alan B. Wissinger, Wilton, Conn.

[73] Assignee: Hughes Aircraft Company, Los Angeles, Calif.

[21] Appl. No.: 260,152

[22] Filed: Aug. 15, 1994

[51] Int. Cl.$^6$ ............................................. H04B 10/00
[52] U.S. Cl. ..................... 359/159; 359/152; 359/172
[58] Field of Search ................................ 359/152, 154, 359/159, 172, 155, 112, 113; 250/206.2, 234

[56] References Cited

U.S. PATENT DOCUMENTS

| | | | |
|---|---|---|---|
| 4,764,982 | 8/1988 | Pfund ......................................... | 359/112 |
| 5,038,406 | 8/1991 | Titterton et al. ......................... | 359/152 |
| 5,042,743 | 8/1991 | Carney .................................... | 244/3.11 |
| 5,065,455 | 11/1991 | Ito et al. .................................. | 359/159 |
| 5,282,073 | 1/1994 | Defour et al. ........................... | 359/159 |
| 5,317,442 | 5/1994 | Sharp et al. ............................. | 359/159 |
| 5,390,040 | 2/1995 | Mayeux .................................... | 359/113 |

OTHER PUBLICATIONS

Hemmati et al, "Laser Transmitter Aims at Laser Beacon", NASA Tech Briefs, Nov. 1993, p. 68.

*Primary Examiner*—Leo Boudreau
*Assistant Examiner*—Bhavesh Mehta
*Attorney, Agent, or Firm*—W. C. Schubert; W. K. Denson-Low

[57] ABSTRACT

An improved system for acquiring and tracking an optical beam. In the illustrative application, the inventive system is used to facilitate optical communication between two satellites and provides an improved technique for acquiring and tracking two optical beams. The illustrative embodiment includes an optical transmitter (26) mounted on the first satellite for transmitting a first optical beam. The beam is scanned over a predetermined area in a predetermined pattern at a predetermined rate. When the beam is detected at the second satellite, the receiver at the second satellite generates a signal indicative of the time at which the beam is detected. This signal is used to modulate a second beam transmitted by the second satellite. The second beam is scanned over a predetermined area in a predetermined pattern at a predetermined rate. A receiver (34, 35, 38, 40, 42) mounted on the first satellite receives the second beam and modulates the first beam with a second signal indicative of the time at which the second beam is detected. Processors (38, 40, 18, 20, 22, 24) on each satellite adjust the scan of the transmitted beam to nutate about the line-of-sight to the remote receiver to track the acquired beam. Thereafter, satellite-to-satellite communication may be effected by continuously detecting and correcting pointing errors and injecting the corrective signals into the normal data stream.

19 Claims, 5 Drawing Sheets

SATELLITE COMMUNICATIONS SYSTEM

BACKGROUND OF THE INVENTION

1. Field of the Invention

The present invention relates to satellite to satellite communication systems. More specifically, the present invention relates to acquisition and tracking systems for satellite to satellite communication systems.

2. Description of the Related Art

In certain applications, satellite to satellite communication is necessary in order to complete a communication link to a ground station. Communication satellite cross-links are currently provided by radio-frequency (RF) transceivers.

While RF technology is technically mature, these systems suffer from certain shortcomings. One shortcoming results from the fact that some RF systems are generally simplex systems allowing communication in one direction at a time. Duplex systems are generally much more costly than simplex systems and are therefore currently of limited application.

In addition, the frequencies available for RF satellite communication is currently very limited. To the extent that a frequency band is available, governmental licenses may be required.

Finally, RF systems offer limited rates for data transmission.

High data rate station to station optical communication through free space is afforded by the use of a very narrow optical beam. Acquisition and tracking of the narrow beam is problematic in that the beam must be pointed at a remote transceiver with microradian accuracy. Optical beams of sufficient brightness are typically tens of microradians in diameter, while the corresponding requirement for RF beamwidths is generally on the order of one to two degrees.

Prior optical communications concepts embody power consuming optical beacons for initial acquisition. An alternative approach involves the scanning of a diffraction limited transmit beam over the region of pointing uncertainty in order to illuminate the remote transceiver. Since the narrow angle transmit beam of both transceivers must be scanned and finally co-aligned (while taking into account the point-ahead angle), the acquisition process was time consuming, to the detriment of the revenue-bearing data stream.

In addition, prior concepts embodied the idea of each transceiver autonomously tracking the image of the other's transmit beam. Many proposed optical communications systems incorporate an expensive charge coupled device (CCD) image sensor or an image-splitting device followed by a quadrant detector. (See "Lightweight Lasercomm Terminal Concept for LEO Orbit Satellite Constellations"; Marshalek, Begley; Ball Aerospace Systems Group-Paper 2123-18, OE/LASE '94, Jan. 22-29, 1994 and "Laser Transmitter Aims at Laser Beacon", Hemmati, Lesh; NASA Tech Briefs, November, 1993.) Since the dynamic range of the pointing error is large (e.g., 1,000:1), a single-stage tracker is not feasible, especially when the communication data rates are considered. Therefore, a coarse-fine implementation with dual detector complements has been the usual approach. However, these systems are typically complicated and expensive.

Thus, there has been a need in the art for an inexpensive system for effecting acquisition and tracking of an optical beam.

SUMMARY OF THE INVENTION

The need in the art is addressed by the present invention which provides a teaching for use in an optical communication system providing an improved system for acquiring and tracking an optical beam. In a most general sense, the inventive system includes a first arrangement mounted at a first location for scanning a beam over a predetermined area. A second arrangement is mounted at a second location for detecting the beam and providing a signal in response thereto. The signal is indicative of the scan position of the beam at a time that the beam is detected. In an alternative embodiment, the scanning operation is performed by the second arrangement. A second alternative embodiment provides a teaching by which the signal indicative of beam position, time, or other scan pertinent information is included in the beam transmitted from the first arrangement.

In the illustrative application, the inventive system is used to facilitate optical communication between two satellites and provides an improved technique for acquiring and tracking two optical beams. The illustrative embodiment includes an optical transmitter mounted on the first satellite for transmitting a first optical beam. The beam is scanned over a predetermined area in a predetermined pattern at a predetermined rate. When the beam is detected at the second satellite, the receiver at the second satellite generates a signal indicative of the time at which the beam is detected. This signal is used to modulate a second beam transmitted by the second satellite. The second beam is scanned over a predetermined area in a predetermined pattern at a predetermined rate. A receiver mounted on the first satellite receives the second beam and modulates the first beam with a second signal indicative of the time at which the second beam is detected. Processors on each satellite adjust the scan of the transmitted beam to nutate about the line-of-sight to the remote receiver to track the acquired beam. Thereafter, satellite-to-satellite communication may be effected by continuously detecting and correcting pointing errors and injecting the corrective signals into the normal data stream.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In an illustrative application, the present invention provides an acquisition and tracking system for use in an optical satellite communications system having a first optical transmitter and a first optical receiver on a first satellite and a second optical transmitter and receiver on a second satellite. As discussed more fully below, the invention provides a system and technique for acquiring and tracking the optical beam transmitted by each satellite. Those skilled in the art will appreciate that the invention is not limited for use with optical beams. Any unidirectional beam or signal may be used without departing from the scope of the present teachings.

Figure 1:
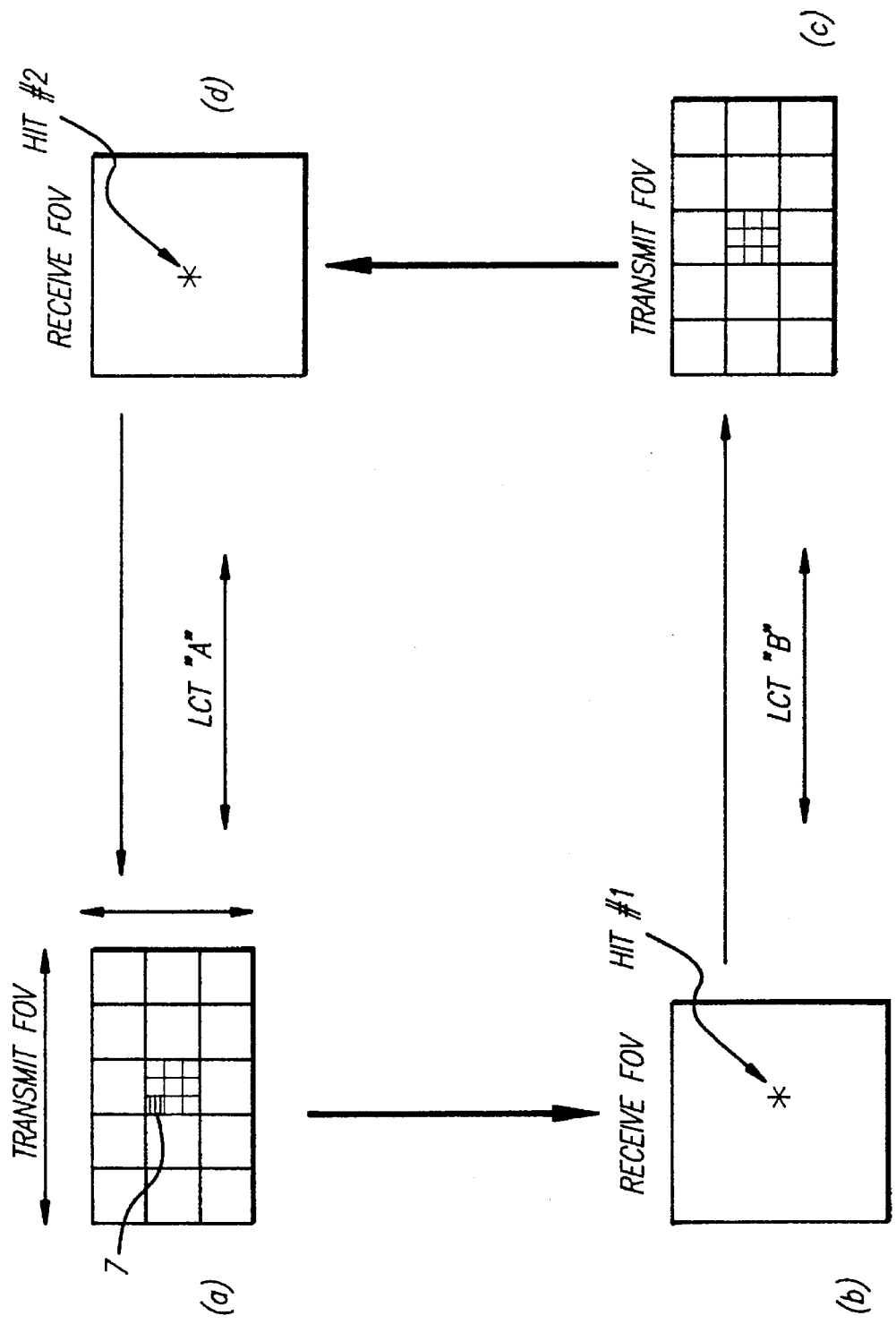
FIG. 1 is a diagram of the operation of the present of the present invention in accordance with an illustrative implementation thereof.

FIG. 1 is a diagram illustrating the acquisition and tracking technique of the present invention. In the illustrative embodiment two optical transmitter/receivers (transceivers) implemented as laser communications terminals "LCT A" and "LCT B" are provided on separate orbiting satellites (not shown). In FIG. 1, a transmit field-of-view (FOV) and a receive FOV are depicted for each transceiver. Coarse pointing information is used to point each of the transmitters. In each case, it may be assumed that the receive FOV is equal to the pointing uncertainty.

Initially, LCT A does not know where LCT B is and vice versa. As a first step (step 1), in accordance with a first illustrative implementation, a precise timing signal from an onboard controller (or from the ground) initiates scanning of each of the LCT transmitters in accordance with the predetermined x-y scan pattern shown. This is depicted in FIGS. 1(a) and 1(c) where the transmit fields-of-view are depicted. Each large rectangle depicts the FOV of the optical beam at each coarse scan position. In the centermost scan position of FIG. 1(a), a matrix of fine scan locations is depicted. As discussed more fully below, the use of coarse and fine scan mechanisms allows for high speed scanning with high resolution.

The transmitted laser beams are initially unmodulated. As each of the beams are scanned over the pointing uncertainty region, one of the two satellites will most probably be illuminated (hit) before the other.

Assume that LCT B is the first to be hit as depicted in FIG. 1(b). In accordance with the inventive method, at step 2, LCT B begins to modulate its transmitted beam with a code indicating the time since it was hit and hence the pointing direction or line-of-sight of LCT A at the time LCT B was hit. At step 3, LCT B transmits its modulated beam. Scanning of LCT B continues until LCT A is hit.

As will be appreciated by one of ordinary skill in the art, the scan rate should be chosen to allow the time or position code to be transferred during the hit or dwell time. Stated alternatively, the dwell time must be sufficient for a time code with adequate resolution to be transmitted. For example, with a laser beam diameter of about 1/1,000 of the diameter of the pointing uncertainty region, the angular divergence of the laser beam is about 30 microradians while the initial uncertainty in pointing is about 2° or 30 milliradians, a ratio of 1,000:1. If the uncertainty region is square, the laser beam must be moved in 1,000 increments horizontally and 1,000 increments vertically to cover the entire region, for a total of 1,000,000 increments. If each of these increments is encoded with a binary code, $2^{20}$ (1,048,576) increments, or a 20 bit binary number, is required to denote each beam position. With a 12.5 megabit per second data transmission capability, a 20 bit number can be transmitted in 1.6 microseconds. This then is the necessary dwell time during the acquisition process.

At step 4, LCT A decodes the modulation signal from LCT B and determines where it was pointing at the time LCT B was hit. Accordingly, LCT A resets its scan to the scan position at which LCT B was hit and modulates its transmit beam with the time since LCT A was hit. If there were no changes in relative bearing between LCT A and LCT B since the last hit of LCT B, the beam transmitted from LCT A would immediately hit LCT B again. LCT A modulates its beam with the time since hit code and if the time is less than a predetermined value that is dependent on the time for the light to travel the expected distance between satellites, LCT B is considered to be pointed at LCT A. When the two beams are so acquired, handshake signals are transferred and closed loop pointing is commenced. In a preferred embodiment, pointing error information is inserted into the data stream.

In the event the relative bearing between the satellites shifted during the scan time between hits, as indicated by the lack of time signals being passed back and forth, the following procedure would be followed. A small amplitude decaying spiral scan, initially equal in amplitude to the most likely (3σ) relative bearing shift, is initiated. At step 5, the beam from LCT A is modulated with the time information since it was hit. When LCT B is hit again, LCT B decodes the time (relative position) data and refines its pointing accordingly. Since there is typically a round-trip transit time for light of approximately 30 milliseconds, for example, the scan rate must be slowed accordingly to avoid a diverging process.

When transmission results in a hit every 30 milliseconds, fine tracking is achieved in accordance with the present teachings by nutating the transmit beam in a square, round or other suitable pattern while data is being transmitted. The pattern 7 (FIG. 1(a)) must be synchronized to the master clock. The receiver measures and stores the average intensity at each of the four corners of the nutation pattern. At the completion of the pattern, the sum and difference of diagonally opposite parts of the pattern are computed and a pointing error derived. This error will be encoded and inserted into the data stream.

Figure 2:
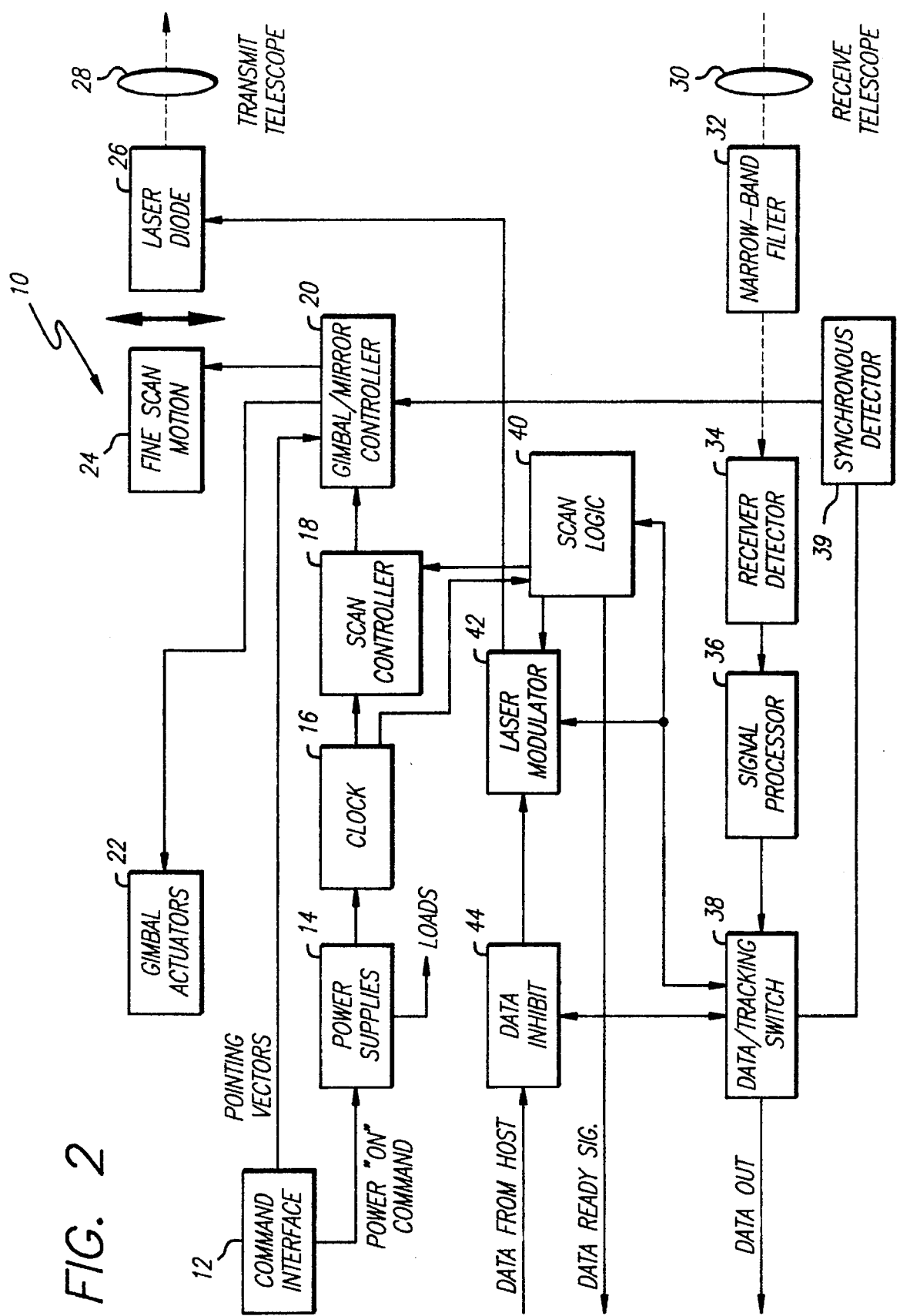
FIG. 2 is a block diagram of an illustrative implementation of a transceiver constructed in accordance with teachings of the present invention.

FIG. 2 is a block diagram of an illustrative implementation of a transceiver constructed in accordance with teachings of the present invention. The transceiver 10 includes a command interface 12 which provides a "power on" command to onboard power supplies 14 and pointing vectors to a gimbal/mirror controller 20. On receipt of power, a clock 16 provides a pulse train to a scan controller circuit 18 and clock pulses to other components in the system as is common in the art.

In the illustrative embodiment, the scan controller circuit 18 is implemented with a read-only memory (ROM) and a digital to analog converter (DAC) (not shown). As will be appreciated by one of ordinary skill in the art, the ROM memory should be able to store a word of a size equal to the number of bits required to define each scan number. The scan-controller 18 provides analog control signals to the gimbal mirror controller 20 which cause the gimbal mirror controller 20 to generate a predetermined scan pattern at a predetermined rate over an area determined by the pointing vectors supplied by the command interface 12. These signals provide for coarse scan control of a laser diode 26 through the gimbal actuators 22 and fine scan motion control of the laser diode 26 through the fine scan mechanism 24. The initially unmodulated laser diode output beam is transmitted by a transmit telescope 28.

When a hit from a remote transmitter is received, the input beam is directed by a receive telescope 30 through a narrowband filter 32 to a detector 34. A conventional signal processor 36 squares the received and detected signal, performs waveform correction and passes the signal to a data/tracking switch 38.

Figure 3:
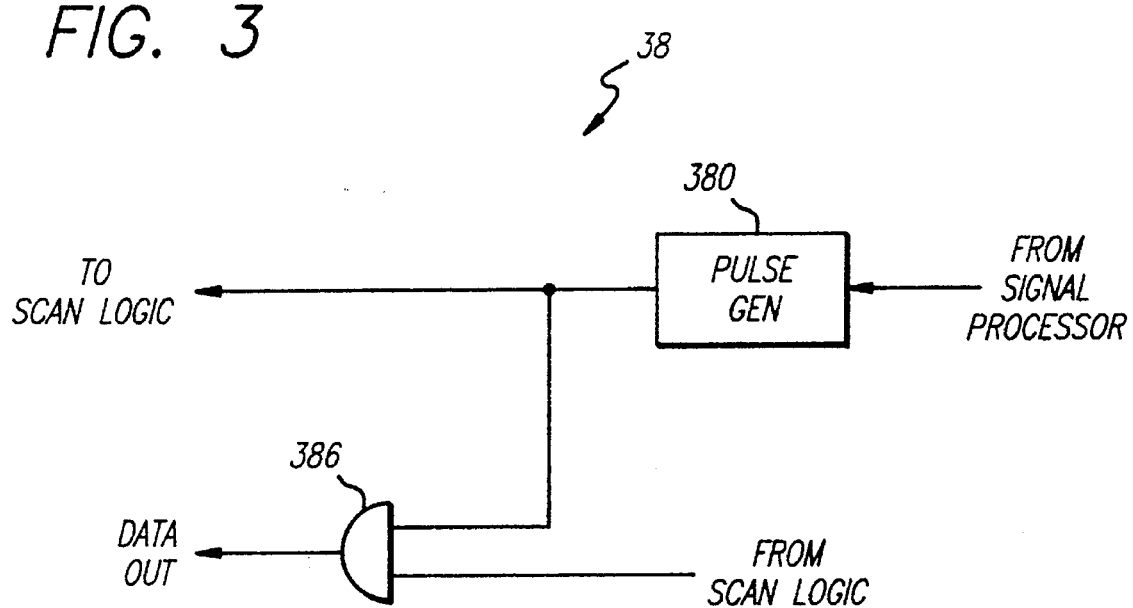
FIG. 3 is an illustrative implementation of the data switch of the illustrative transceiver of the present invention.

FIG. 3 is an illustrative implementation of the data switch 38. The switch 38 includes a pulse generator 380 which receives input from the signal processor 36. Clock or position data supplied by the scan controller 18 is latched to the scan logic circuit 40 by an enabling pulse from a pulse generator on receipt of a hit. Hence, clock or position data is output to the scan logic circuit 40. (In the tracking mode, when acquisition is complete, data is enabled to be output on command from the scan logic circuit 40 to an AND gate 386.)

In the acquisition mode, on receipt of a hit, the data/tracking switch 38 provides a signal to a scan logic circuit 40. In the preferred embodiment, the scan logic circuit is implemented in firmware with a microprocessor.

Figure 4:
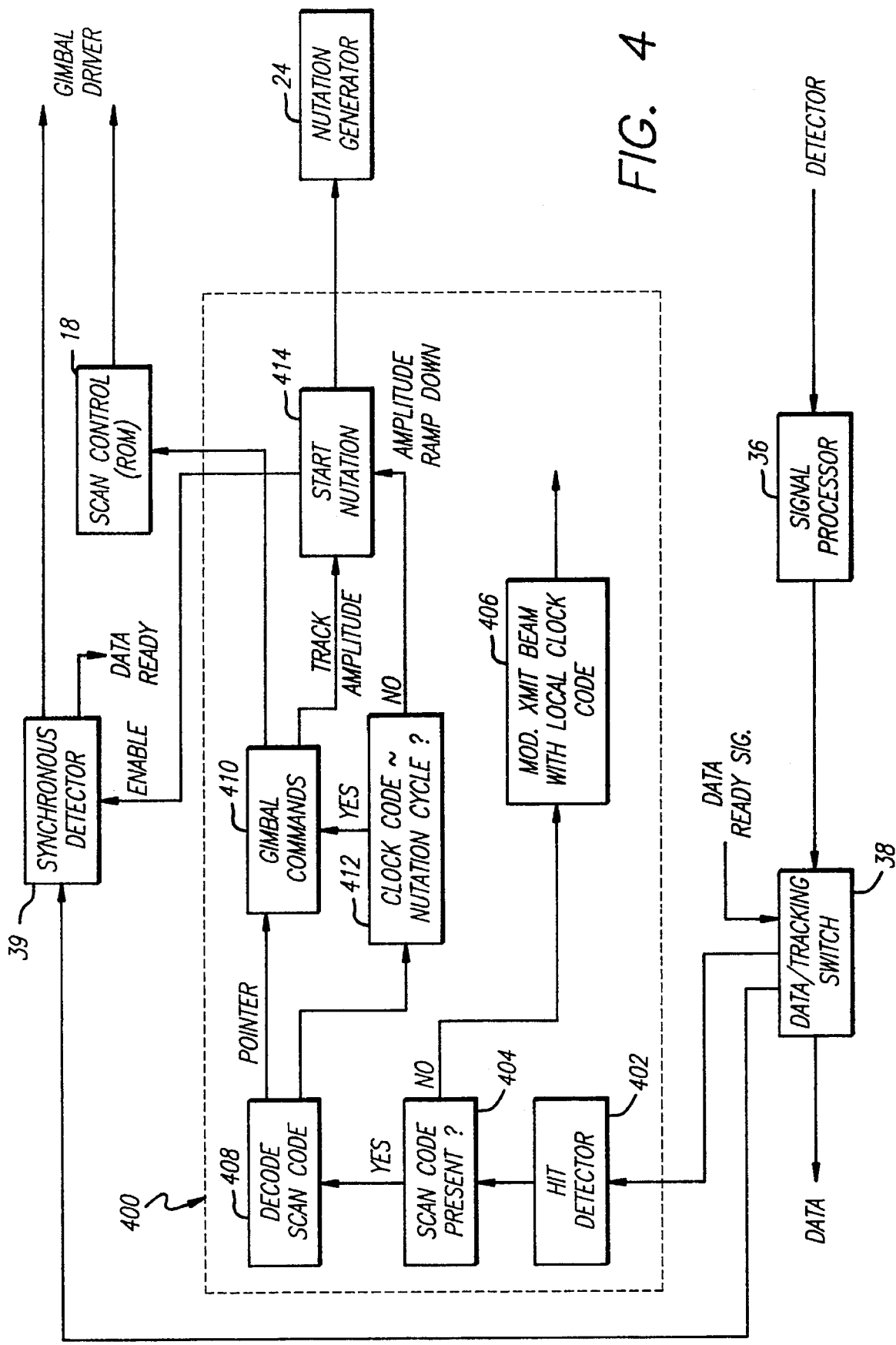
FIG. 4 is a flow diagram of the firmware used to provide scan logic for the transceiver of the present invention.

FIG. 4 is a flow diagram of the firmware used to provide scan logic for the transceiver of the present invention. The pulses received by the detector 34 of FIG. 2 are shaped and squared by the signal processor 36 and the data tracking switch 38. The received pulses are thresholded at 402 to determine that there has in fact been a hit. If a hit is detected, at step 404, the system checks for a scan or clock code indicating the scan position at which the remote receiver was hit. If no-code is present, at step 406 the transmit beam is modulated with the local clock or scan code. If a code is present, at step 408 the scan code is decoded. This provides a pointer to command the gimbal (through the ROM in the scan controller 18) in response to the scan code at step 410. Thereafter, at step 414, nutation of the transmit beam is initiated through the fine scan mechanisms (i.e., the scan controller 18, the gimbal mirror controller 20 and the fine scan motion 24). If the clock code does not change over a cycle time, at step 412, the system commands the gimbal to create a spiral pattern, or other suitable pattern, to reacquire the remote transceiver as disclosed above. If the clock code changes, the amplitude of the nutation is maintained for fine tracking at step 414. After multiple hits per nutation cycle condition is achieved (step 414), a conventional synchronous detector 39 is enabled and closed-loop tracking commences.

A data ready signal is provided by the synchronous detector and fed into the AND gate 386 of the data switch 38 (FIG. 3) and to the data inhibit circuit 44 to enable the flow of data to and from a host.

Figure 6:
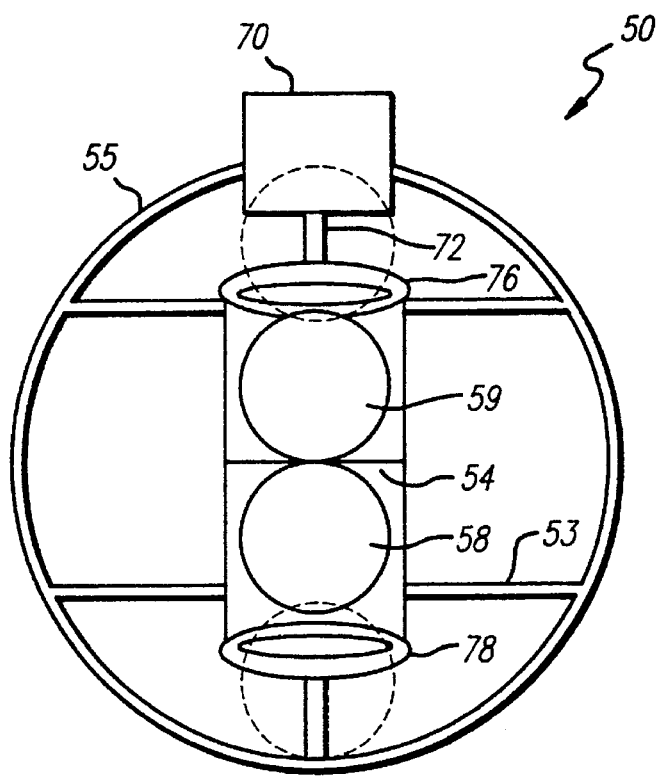
FIG. 6 is a frontal view of the optical arrangement of FIG. 5.
Figure 5:
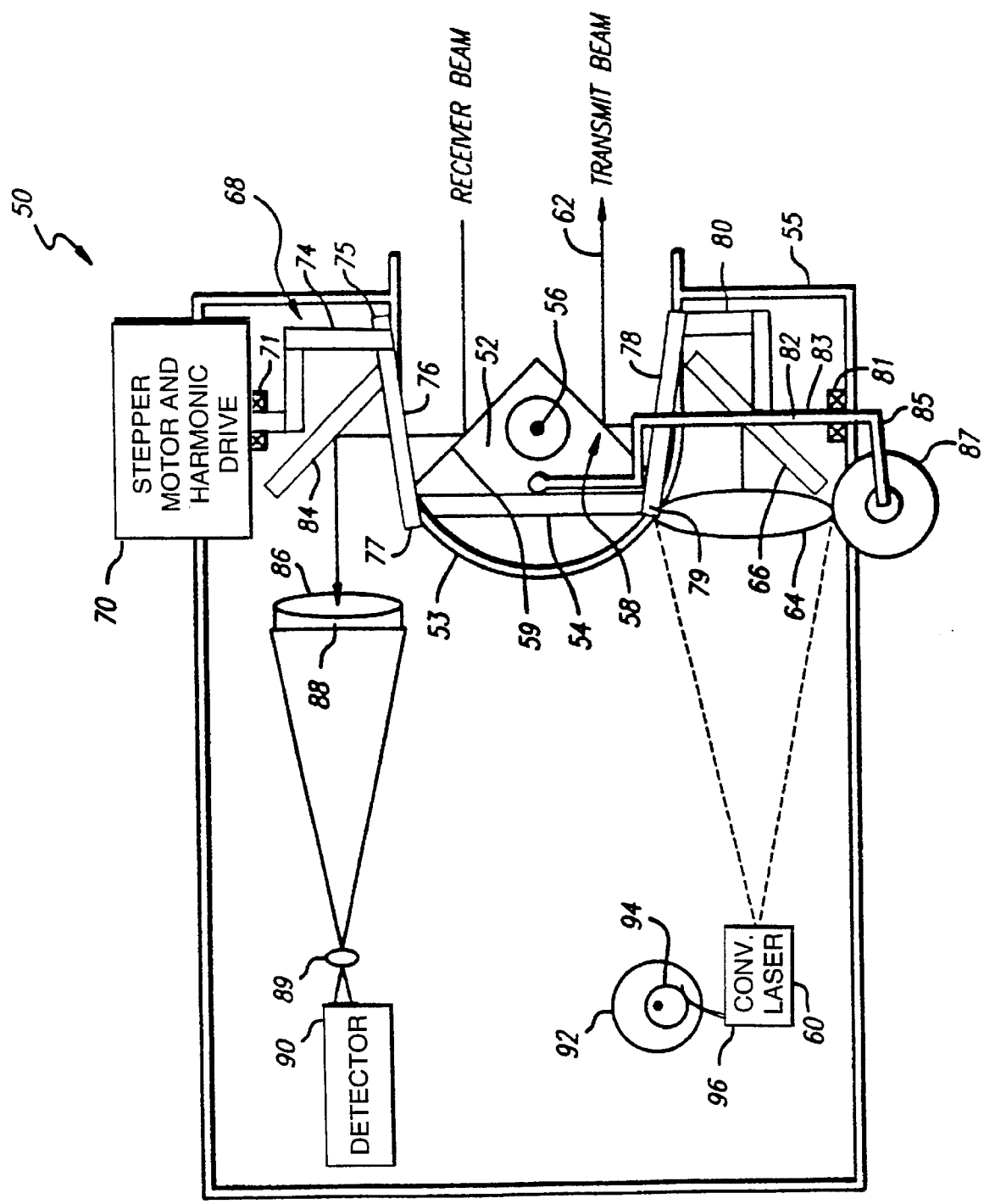
FIG. 5 shows an illustrative implementation of the optical arrangement of the communication system of the present invention.

FIG. 5 shows an illustrative implementation of the optical arrangement of the communication system of the present invention. FIG. 6 is a frontal view of the optical arrangement of FIG. 5. As illustrated in FIGS. 5 and 6, the arrangement 50 includes a gimballed prism 52 mounted within a prism housing 54 for pivotal motion about the elevation and azimuthal axes. The flex pivot 56 provides elevation articulation. Azimuth articulation is provided by coaligned shafts 72 and 82, mounted in bearings 71 and 81, respectively. The prism is disposed within a cutout 53 of housing 55. The prism 52 is constructed of a low-expansion glass and has first and second surfaces 58 and 59 coated with an optical film to be reflective in a predetermined narrow wavelength band. Light from a conventional laser (with an associated optical arrange) 60 is focused into a beam 62 by a focusing lens 64. The beam is reflected to the first surface 58 by a fixed mirror 66. The first surface 58 reflects the transmit beam 62 toward the scan area. Movement of the prism 52 about the pivot 56 causes the beam to scan in elevation, as previously noted. This is effected by a push rod 83 and lever arrangement 85. The push rod 83 is shaped like a yoke to avoid obscuration of the optical path. The lever 85 is rotated by the elevation stepper motor and harmonic drive 87, translating the push rod 83 along the axis of shaft 82. Motion of the push rod 83 causes the prism 52 to rotate in elevation. A pivot (not shown) is incorporated at the juncture of lever 85 and push rod 83, allowing the push rod to accommodate azimuth motion of the gimbaled prism. Push rod 83 and hollow shaft 82 are coaxial in the region of the bearing 81.

Shaft 72 is rotated in response to the stepper motor and harmonic drive combination 70. Rotation of the shaft 72 is effective to cause the prism 52 to scan the beam in azimuth. This is effected by a push rod arrangement 68 which is connected to the combination stepper motor and harmonic drive 70. The push rod arrangement 68 includes a shaft 72 which is adapted to rotate about the longitudinal axis thereof. The shaft 72 is connected to the prism 52 by a first push rod 74 which is connected to a first ring 76. The first push rod 72 is connected to the ring 76 at a pivot point 75. The ring 76 is connected to the prism housing 54 at a point 77 diametrically opposed from the push rod/ring pivot 75. A second ring 78 is connected to a second end of the prism housing 54 at point 79. The opposite end of the ring 78 is connected to a connecting rod 80.

The receive beam is reflected off of the second surface 59 of the prism 52 and off of a second mirror 84 to a receiver objective lens 86. A filter 88 is disposed at the objective lens 86. In the illustrative embodiment, a lens 89 re-images the entrance pupil (lens 86) onto a detector 90 such as an avalanche photodiode. This arrangement eliminates the need to boresight accurately the receiver with the transmitter.

Fine elevation scanning is effected by vibrating the laser diode 60 in a controlled manner. This may be effected with a piezo-electric or electro-optical transducer (not shown), or with the stepper motor 92, cam 94 and bifurcated flexure arrangement 96 of FIG. 5.

In accordance with a first alternative implementation, the scanning of LCT B is not initiated until it receives a hit from LCT A. On receipt of a hit, LCT B modulates its beam with time of hit data and scans until LCT A is hit in the manner described above.

In a second alternative implementation, the signal indicative of the position of the scanning beam or timing information is generated by a first transmitter and modulated onto its output beam. This signal is then detected at a receiver and retransmitted back to the first transceiver. The signal is processed in the manner described above to facilitate accurate pointing and tracking.

The two alternative implementations could be combined so that scanning of LCT B would not begin until receipt of a hit from LCT A. On receipt of a hit, LCT B would echo scan position or scan time data back to LCT A through the modulation of its beam. These approaches would eliminate synchronization error between the onboard clocks of the two satellites.

Those skilled in the art of control system design will recognize that the critical variable to be controlled is the position of the beam footprint relative to the receiver. The beam footprint is much, much larger than the receiver. The intensity distribution will be approximately Gaussian in shape. By cyclically sweeping the beam footprint over the receiver with an amplitude less than its 1/e² diameter, the location of the center of the beam is continuously measurable. In a manner analogous to the transmission of the signal indicative of the time when the scanned beam is detected (as described above), the detector signal measuring the beam profile is used to modulate the beam of the second arrangement. (This beam is simultaneously swept over the receiver of the first arrangement in a controlled manner.) At the first arrangement, the received signal is demodulated and synchronously detected, yielding the pointing error of the beam at the second arrangement. The resulting pointing error signal is used to correct the pointing of the beam at the first arrangement. Similarly, synchronous detection and pointing error detection and pointing error correction is accomplished at the second arrangement. Closed-loop pointing control is thus accomplished by using the communications capability of the two arrangements. All perturbing effects, including the velocity aberration ("Point-ahead") are sensed and corrected for by the closed-loop servo.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. In an optical communication system, an improved system for acquiring and tracking an optical beam, the improved system comprising:

first means mounted at a first location for scanning a first transmit beam over a predetermined area and second means mounted at a second location for detecting the first transmit beam and providing a first signal in response thereto indicative of the scan position of the first transmit beam at a time that the first transmit beam is detected by the second means, said first signal further providing an indication of the time at which the first transmit beam was detected by the second means, and said second means further including means for modulating a second transmit beam with the first signal.

2. The invention of claim 1 wherein the first signal is generated by the first means and transmitted to the second means by the first transmit beam.

3. The invention of claim 1 wherein the first signal is generated by the second means.

4. The invention of claim 1 wherein the first means includes means for scanning the first transmit beam over the predetermined area at a predetermined rate and in accordance with a predetermined pattern.

5. The invention of claim 1 including third means mounted at the second location for transmitting the second transmit beam.

6. The invention of claim 5 including fourth means mounted at the first location for receiving the second transmit beam and providing a second signal in response thereto indicative of the scan position of the second transmit beam at a time that the second transmit beam is detected by the fourth means.

7. In an optical communication system, an improved system for acquiring and tracking an optical beam, the improved system comprising:

first means mounted at a first location for transmitting a first transmit beam over a predetermined area and second means mounted at a second location for detecting the first transmit beam, the second means including means for scanning a first receive beam over a predetermined area and providing a first signal on receipt of the first transmit beam indicative of the scan position of the first receive beam at a time that the first transmit beam is detected by the second means, said first signal further providing an indication of the time at which the first transmit beam was detected by the second means, and said second means further including means for modulating a second transmit beam with the first signal.

8. The invention of claim 7 wherein the first signal is generated by the first means and transmitted to the second means by the first transmit beam.

9. The invention of claim 7 wherein the first signal is generated by the second means.

10. The invention of claim 7 wherein the second means includes means for scanning the first receive beam over the predetermined area at a predetermined rate and in accordance with a predetermined pattern.

11. The invention of claim 9 including third means mounted at the second location for transmitting the second transmit beam.

12. An optical communication system between two satellites including an improved system for acquiring and tracking two optical beams, the improved system comprising:

first means mounted on the first satellite for scanning a first optical beam over a predetermined area in a predetermined pattern at a predetermined rate;

second means mounted on a second satellite for detecting the first beam and providing a first signal in response thereto indicative of a time at which the first transmit beam is detected by the second means;

third means mounted on the second satellite for scanning a second optical beam over a predetermined area in a predetermined pattern at a predetermined rate, the third means including means for modulating the second transmit beam with the first signal;

fourth means mounted on the first satellite for receiving the second transmit beam and providing a second signal in response thereto indicative of a time at which the second transmit beam is detected by the fourth means, the fourth means including means for modulating the first beam with the second signal;

fifth means mounted on the first satellite for processing the first signal and determining the position of the second satellite and adjusting the scan of the first beam in response thereto; and sixth means mounted on the second satellite for processing the second signal and determining the position of the first satellite and adjusting the scan of the second beam in response thereto.

13. The invention of claim 12 wherein the first signal is generated by the first means and transmitted to the second means by the first transmit beam.

14. In an optical communication system, an improved method for acquiring and tracking an optical beam, the improved method including the steps of:

scanning a first transmit beam from a first location over a predetermined area detecting the first transmit beam at a second location and providing a first signal in response thereto indicative of the scan position of the first transmit beam at a time that the first transmit beam is detected, said first signal providing an indication of the time at which the first transmit beam was detected;

modulating a second transmit beam with the first signal.

15. The invention of claim 14 including the step of transmitting the first signal in the first beam.

16. In an optical communication system, an improved method for acquiring and tracking an optical beam, the improved method including the steps of:

transmitting a first transmit beam from a first location;

detecting the first transmit beam at a second location, including the step of scanning a first receive beam over a predetermined area and providing a first signal on receipt of the first transmit beam indicative of the scan position of the first receive beam at a time that the first transmit beam is detected by the second means, said first signal further providing an indication of the time at which the first transmit beam was detected by the second means; and modulating a second transmit beam with the first signal.

17. The invention of claim 16 including the step of transmitting the first signal in the first beam.

18. An improved system for acquiring and tracking two optical beams including the steps of:

scanning a first optical beam from a first satellite over a predetermined area in a predetermined pattern at a predetermined rate;

detecting the first beam at a second satellite and providing a first signal in response thereto indicative of a time at which the first transmit beam is detected;

scanning a second optical beam from the second satellite over a predetermined area in a predetermined pattern at a predetermined rate, including the step of modulating the second transmit beam with the first signal;

receiving the second transmit beam at the first satellite and providing a second signal in response thereto indicative of a time at which the second transmit beam is detected, including the step of modulating the first beam with the second signal;

processing the first signal and determining the position of the second satellite and adjusting the scan of the first beam in response thereto; and processing the second signal and determining the position of the first satellite and adjusting the scan of the second beam in response thereto.

19. The invention of claim 18 including the step of transmitting the first signal in the first beam.

* * * * *